United States Patent
Leal Herrera et al.

(10) Patent No.: US 11,949,558 B2
(45) Date of Patent: *Apr. 2, 2024

(54) METHOD AND SYSTEM FOR AUTOMATIC CONFIGURATION OF A COMMUNICATIONS INTERFACE FOR A SPECIALIZED DATA NETWORK OF AN AIRCRAFT

(71) Applicant: GE AVIATION SYSTEMS LLC, Grand Rapids, MI (US)

(72) Inventors: Víctor Mario Leal Herrera, Querétaro (MX); Joachim Karl Ulf Hochwarth, Caledonia, MI (US); Jason Chung-Jo Ling, Sunnyvale, CA (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,975

(22) Filed: Jan. 11, 2023

(65) Prior Publication Data

US 2023/0164031 A1    May 25, 2023

Related U.S. Application Data

(63) Continuation of application No. 17/081,240, filed on Oct. 27, 2020, now Pat. No. 11,558,256.
(Continued)

(51) Int. Cl.
*H04L 41/08* (2022.01)
*B64D 43/00* (2006.01)
(Continued)

(52) U.S. Cl.
CPC .......... *H04L 41/0876* (2013.01); *B64D 43/00* (2013.01); *G06F 3/0482* (2013.01);
(Continued)

(58) Field of Classification Search
CPC ... H04L 41/0876; H04L 67/12; H04L 67/141; H04L 69/329; B64D 43/00; G06F 3/0482
See application file for complete search history.

(56) References Cited

U.S. PATENT DOCUMENTS

| 7,908,042 B2 | 3/2011 | Brinkley et al. |
| 8,364,328 B2 | 1/2013 | Hedrick |

(Continued)

FOREIGN PATENT DOCUMENTS

| CA | 2638512 A1 * | 2/2009 | ......... H04B 7/18506 |
| CA | 2638512 C | 6/2017 | |

(Continued)

*Primary Examiner* — Cheikh T Ndiaye
(74) *Attorney, Agent, or Firm* — McGarry Bair PC

(57) ABSTRACT

A method of automatic configuration of a communications interface of an unknown data network, the method comprising connecting an Electronic Flight Bag (EFB) to the unknown data network, attempting to open communication ports, in response to attempting to open communication ports, receiving data from the unknown data network, determining, by a controller module, if the selected communications interface can interpret the received data, and operating the communications interface of the EFB in accordance with the selected communications interface.

20 Claims, 5 Drawing Sheets

Related U.S. Application Data

(60) Provisional application No. 62/926,809, filed on Oct. 28, 2019.

(51) Int. Cl.
  *G06F 3/0482* (2013.01)
  *H04L 67/12* (2022.01)
  *H04L 67/141* (2022.01)
  *H04L 69/329* (2022.01)

(52) U.S. Cl.
  CPC ............ *H04L 67/12* (2013.01); *H04L 67/141* (2013.01); *H04L 69/329* (2013.01)

(56) References Cited

U.S. PATENT DOCUMENTS

| | | |
|---|---|---|
| 8,957,791 B2 | 2/2015 | Macrae et al. |
| 9,826,039 B2 | 11/2017 | Goldstein et al. |
| 9,873,521 B2 | 1/2018 | Macrae |
| 10,008,122 B2 | 6/2018 | Hardt et al. |
| 10,116,749 B2 | 10/2018 | Gunn et al. |
| 10,225,349 B2 | 3/2019 | Dusik et al. |
| 11,083,041 B2 | 8/2021 | Batsakes et al. |
| 2007/0016344 A1* | 1/2007 | Stefani ................ H04L 65/1069 701/3 |
| 2014/0222254 A1 | 8/2014 | Ribich |
| 2018/0007137 A1* | 1/2018 | Watson ............. H04W 28/0215 |
| 2018/0026706 A1* | 1/2018 | Scacchi ................ G08G 5/0021 701/3 |
| 2018/0366010 A1 | 12/2018 | Agam et al. |
| 2019/0012921 A1 | 1/2019 | Pearson et al. |
| 2019/0090180 A1* | 3/2019 | Judd ..................... H04W 64/00 |
| 2019/0327307 A1 | 10/2019 | Watson et al. |

FOREIGN PATENT DOCUMENTS

| | | | |
|---|---|---|---|
| CN | 107128498 B | 5/2022 | |
| EP | 2196775 A2 * | 6/2010 | ............. G01C 23/00 |
| EP | 2196775 B1 | 4/2015 | |

\* cited by examiner

METHOD AND SYSTEM FOR AUTOMATIC CONFIGURATION OF A COMMUNICATIONS INTERFACE FOR A SPECIALIZED DATA NETWORK OF AN AIRCRAFT

CROSS REFERENCE TO RELATED APPLICATION(S)

This application claims priority to and benefit of U.S. Provisional Patent Application No. 62/926,809, filed Oct. 28, 2019, and U.S. patent application Ser. No. 17/081,240, filed Oct. 27, 2020, now allowed, both of which is incorporated herein in its entirety.

TECHNICAL FIELD

This disclosure relates generally to interfacing a device for communication between the device and an unknown avionics-specific data network.

BACKGROUND

For contemporary aircraft, an avionics 'platform' includes of a variety of elements such as sensors, data concentrators, a data communications network, radio frequency sensors and communication equipment, computational elements, operational or functional elements, and graphical displays. These components can share information with other components over the data communications network.

Transfer of data to and from components, or over the data communications network, can utilize specialized data networks, such as Aeronautical Radio Inc. (ARINC) compliant data networks, and can define standards or specifications for network operations, including data transmissions. Different aircraft or avionics platforms can further utilize different specialized data networks, or utilize a combination of different specialized data networks. Network components utilized to construct the data network can utilize a specialized data network protocol, hardware including relays, switches, communicative connections, and the like, to ensure performance of the network architecture for the specialized data, or under the performance of the network communications defined by various data network specifications.

BRIEF DESCRIPTION

In one aspect, the present disclosure relates to a non-transitory computer readable medium storing a program configured to cause a computer to execute a method of automatic configuration of a communications interface of an aircraft data network, the method of automatic configuration including connecting an Electronic Flight Bag (EFB) to the aircraft data network, the aircraft data network being one of a set of data networks defined by a communications data library defining a corresponding set of communications data library configurations, attempting to open communication ports of the aircraft data network based on one of the set of communications data library configurations, defining a selected communications interface, in response to attempting to open communication ports, receiving data from the aircraft data network, determining, by a controller module, if the selected communications interface can interpret the received data, and upon successful interpretation of the received data, operate the communications interface of the EFB in accordance with the selected communications interface.

In another aspect, the present disclosure relates to a non-transitory computer readable medium storing a program configured to cause a computer to execute a method of communicating with an avionics specific data network, the method of communication including upon connection of a communications interface with the avionics specific data network, select a communication interface configuration, attempt to open communication ports of the avionics specific data network based on the selected communication interface configuration, receive data from the avionics specific data network, determine if the selected communication interface configuration can interpret the received data, and upon successful interpretation of the received data, operate the communications interface in accordance with the selected communication interface configuration.

In yet another aspect, the present disclosure relates to a communications device for communicating with an unknown avionics specific data network, including a memory, and a controller module, wherein the controller module is configured to execute a set of instructions stored in the memory, the set of instructions including: upon connection of a communications interface with the unknown avionics specific data network, select a known communication interface configuration, attempt to open communication ports of the unknown avionics specific data network based on the selected known communication interface configuration, receive data from the unknown avionics specific data network, determine if the selected known communication interface configuration can interpret the received data, and upon successful interpretation of the received data, operate the communications interface in accordance with the selected known communication interface configuration.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

DETAILED DESCRIPTION

Figure 1:
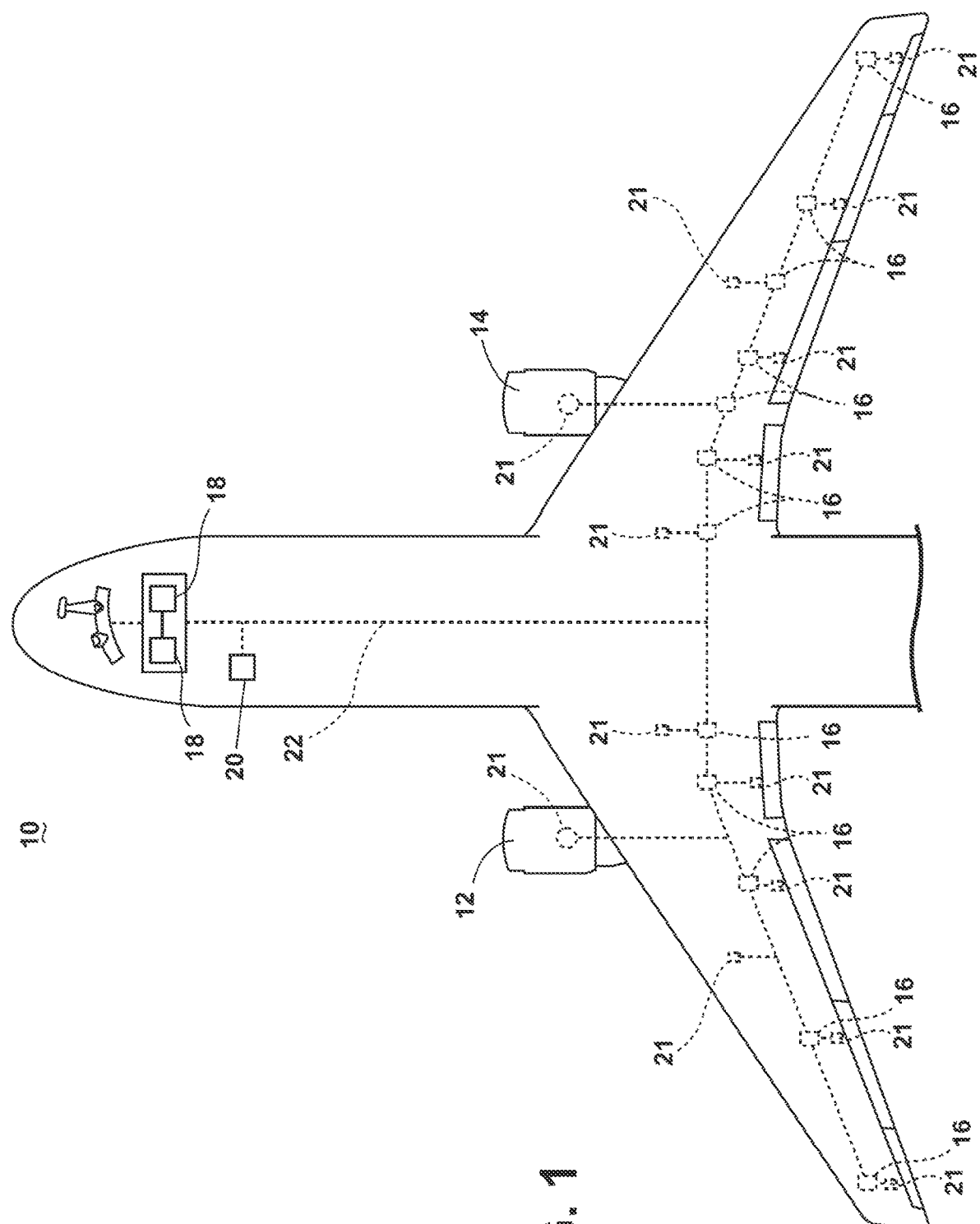
FIG. 1 is a top down schematic view of an example aircraft and avionics data network architecture of an aircraft, in accordance with various aspects described herein.

Aspects of the disclosure described herein are provided with respect to a specialized avionics data protocol, but it will be understood that the apparatus and method described herein can be implemented in any environment using a data communications network interconnecting a set of data-generating components or devices with a set of data-consuming components or avionics systems, computers, or the like. Aspects of the disclosure can include data communications networks configured to operate according to defined network characteristics or specifications. For example, contemporary aircraft operate a set of components interconnected by way of a data network defined by a network standard, such as the ARINC, or a subdivision thereof, for example ARINC 429 (A4290) specification, ARINC 664 (A664), Ethernet, or the like, which are incorporated herein in their entirety. Furthermore, while the aforementioned examples can include network topology examples, application level protocol standards, including but not limited to, ARINC 702A (A702A), ARINC 834 (A834), or the like, can be included in their entirety. While aspects of the disclosure refer to the ARINC-based specifications, aspects of the disclosure are applicable to other specialized data networks, or the like utilized for data transmissions between a set of interconnected data sources and data destinations.

Furthermore, as used herein, the term "set" or a "set" of elements can be any number of elements, including only one. Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements. Additionally, as used herein, "electrical connection" or "electrically coupled" can include a wired or wireless power or data (e.g. communicative or transmissive) connection between respective components.

Additionally, as used herein, a "controller" or "controller module" can include a component configured or adapted to provide instruction, control, operation, or any form of communication for operable components to affect the operation thereof. A controller module can include any known processor, microcontroller, or logic device, including, but not limited to: Field Programmable Gate Arrays (FPGA), an Application-Specific Integrated Circuit (ASIC), a full authority digital engine control (FADEC), a Proportional controller (P), a Proportional Integral controller (PI), a Proportional Derivative controller (PD), a Proportional Integral Derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to affect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like.

While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient volatile or non-transient, or Non-Volatile Memory (NVM). Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

The exemplary drawings are for purposes of illustration only and the dimensions, positions, order and relative sizes reflected in the drawings attached hereto can vary.

As illustrated in FIG. 1, an aircraft 10 can include at least one propulsion engine, shown as a left engine system 12 and right engine system 14. The aircraft 10 can further include one or more data sources, that is, components that create, originate, or otherwise generate data, and data destinations, that is, components that receive, consume, process, or otherwise act on or effect an outcome or operation based on data received. As shown, the aircraft 10 can include one or more avionics system 18, including, but not limited to data storage or processing units, or functional systems such as the Flight Management System (FMS) or autopilot system, and a set of fixed aircraft components, such as Line-Replaceable Units (LRUs) 21, networking end nodes, or modular components of a vehicle or aircraft.

Additional communicative devices can be included and connectable with the aircraft 10, and can include, but is not limited to, a Connected Flight Management System (CFMS) or EFB operational aspects, functional operations, or the like. FIG. 1 illustrates a representative EFB 20 as one non-limiting example. The CFMS or EFB 20 can include moveable, mobile, or otherwise removable devices that are adapted or configured to communicate with the aircraft 10, avionics system 18, LRUs 21, or the like, by way of a series of transmission pathways 22, network relays, or network switches 16 (collectively, a "network mesh"). In contrast, the avionics system 18, and the LRUs 21 can include stationary data sources. As used herein, "stationary" denotes that the avionics system 18 or LRU 21 can include devices that are generally fixed or incorporated into the aircraft 10 and would require significant work or maintenance services to remove from the aircraft 10, whereas "non-stationary" devices such as the EFB 20 can include devices that can be moveable relative to the aircraft or data network, such as carried by one the flight crew from one location to another either on, or off the aircraft 10. Non-limiting examples of the EFB 20 can include a handheld device such as a tablet, palm-pilot, pager, portable computer, smart device, or the like, that can be carried onto the aircraft 10 by the flight crew. In contrast, a stationary the avionics system 18 or LRU 21 can be, for example, a cockpit display, cockpit computer, or the like. In another example, the EFB 20 can be stationary.

In the aircraft environment, the avionics system 18, or the EFB 20, the transmission pathways 22, and the like, can be designed, configured, or adapted to operate according to a particular operation, interoperability, or form factor standards, such as those defined by ARINC series standards. In the exemplary aspects illustrated, the avionics system 18 can be positioned near the nose, cockpit, or pilot of the aircraft 10 and the EFB 20 can be positioned near the nose, cockpit, or pilot of the aircraft 10, however, any relative arrangement can be included.

The avionics system 18 and EFB 20 can be configured to be communicatively coupled by way of the series of transmission pathways 22, network relays, or network switches 16. While network switches 16 are schematically illustrated, non-limiting aspects of the disclosure can be applied to peer-to-peer networks. The transmission pathways 22 can include a physical connection between the respective components, such as a wired connection including Ethernet, or can include wireless transmission connections, including, but not limited to, WiFi (e.g. 802.11 networks), Bluetooth, and the like. Collectively, the avionics system 18, EFB 20, transmission pathways 22, and switches 16 can form an avionics data network, or avionics-specific data network for the aircraft.

The aircraft 10, and the systems thereof, can be communicatively interconnected by way of the avionics-specific data network such has an ARINC-compatible data network. The avionics-specific data network can be, in one non-limiting example, an ARINC 429 (A429) compatible data network. It will be appreciated that the aircraft 10, and the systems thereof can be any avionics-specific data network compatible with any ARINC data network, including but not limited to an A664 data network, or any other known avionics-specific data network.

The EFB 20 can include, for example, entirely contained systems, radios, or other auxiliary equipment to manage or operate aircraft functions. At least a set of avionics system 18 or EFB 20 can, for example, generate data, which can be modified, computed, or processed prior to, or in preparation for packaging the data into data frames to be transmitted over the avionics data network by way of the transmission pathways 22 or switches 16. At least another set of avionics system 18 or EFB 20 can, for example, consume the data transmitted over the avionics data network. In some instances, a single avionics system 18 or EFB 20 can operate to both generate and consume data. As used herein, "consume," "consuming," or "consumption" of data will be understood to include, but is not limited to, performing or executing a computer program, routine, calculation, or process on at least a portion of the data, storing the data in memory, or otherwise making use of at least a portion of the data.

The illustrated aircraft 10 is merely one non-limiting example of an aircraft 10 that can be used in aspects of the disclosure described herein. Particularities of the illustrated aircraft 10 aspects, including relative size, length, number of engines, type of engines, and location of various components are not germane to the aspects of the disclosure, unless otherwise noted.

Figure 2:
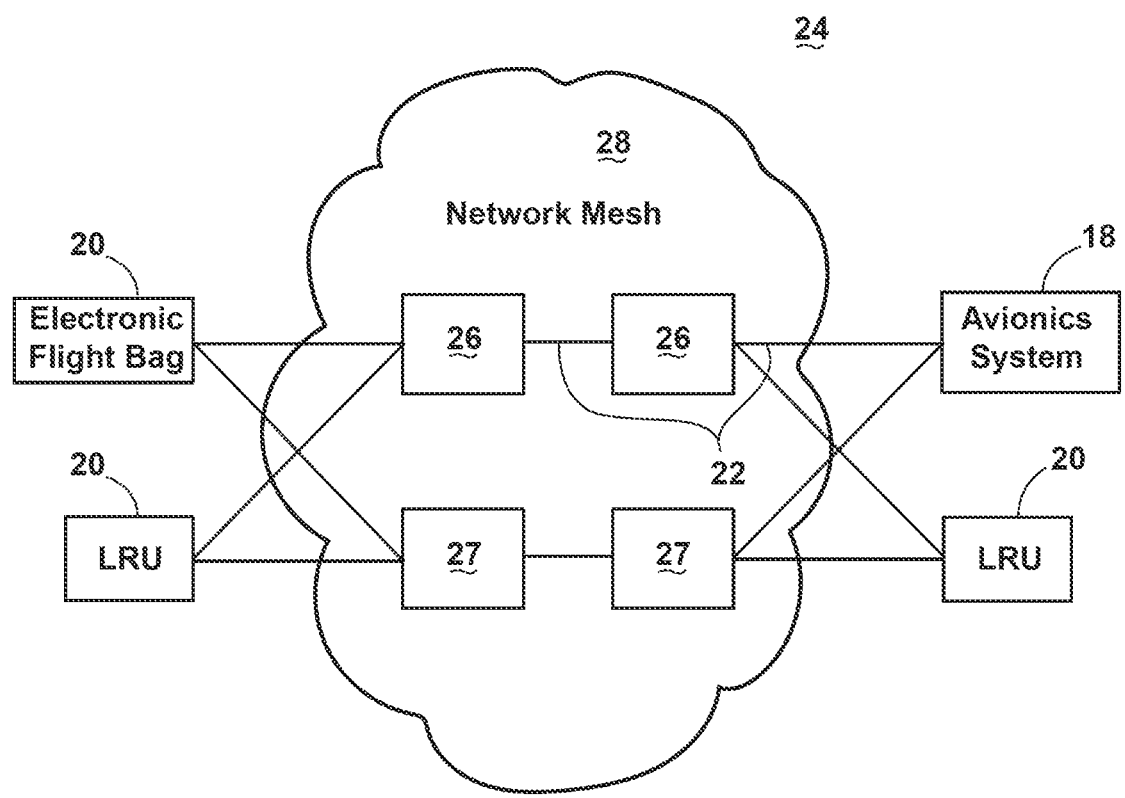
FIG. 2 is a schematic view of an example avionics data network of FIG. 1, in accordance with various aspects described herein.

FIG. 2 illustrates a non-limiting schematic view of a specialized data network 24 according to aspects of the disclosure. The specialized data network 24 can include various components, and perform the functions of an avionics data network outlined herein. The specialized data network can include, but is not limited to, a set of redundant network switching units, such as a first set of switching units 26 defining a first path and a second set of switching units 27 defining a second, or redundant, path. The first and second switching units 26, 27 collectively define a network mesh 28 for routing the transmission of data frames between respective components, such as to and from the avionics system 18, and EFB 20 via the transmission pathways 22. As previously described, the transmission pathways 22 can be any communicative pathway, including but not limited to, wired or wireless communication connections. In one non-limiting example, the network mesh 28 is further shown having a set of transmission pathways 22 between the network switching units 26, 27 to provide redundancy in transmission pathways 22. In one non-limiting example, the network mesh 28, the first set of switching units 26, the second set of switching units 27, or a combination thereof, can be arranged, configured, or otherwise enabled to utilize a specialized data network 24 transmission schema. The aspects of the disclosure illustrated in FIG. 2 is merely one representation of the specialized data network 24, and alternative configurations, organization, and component quantities, including, but not limited to, avionics system 18, including but not limited to the EFB 20, LRUs 21, or network switching units 26, are envisioned.

Figure 3:
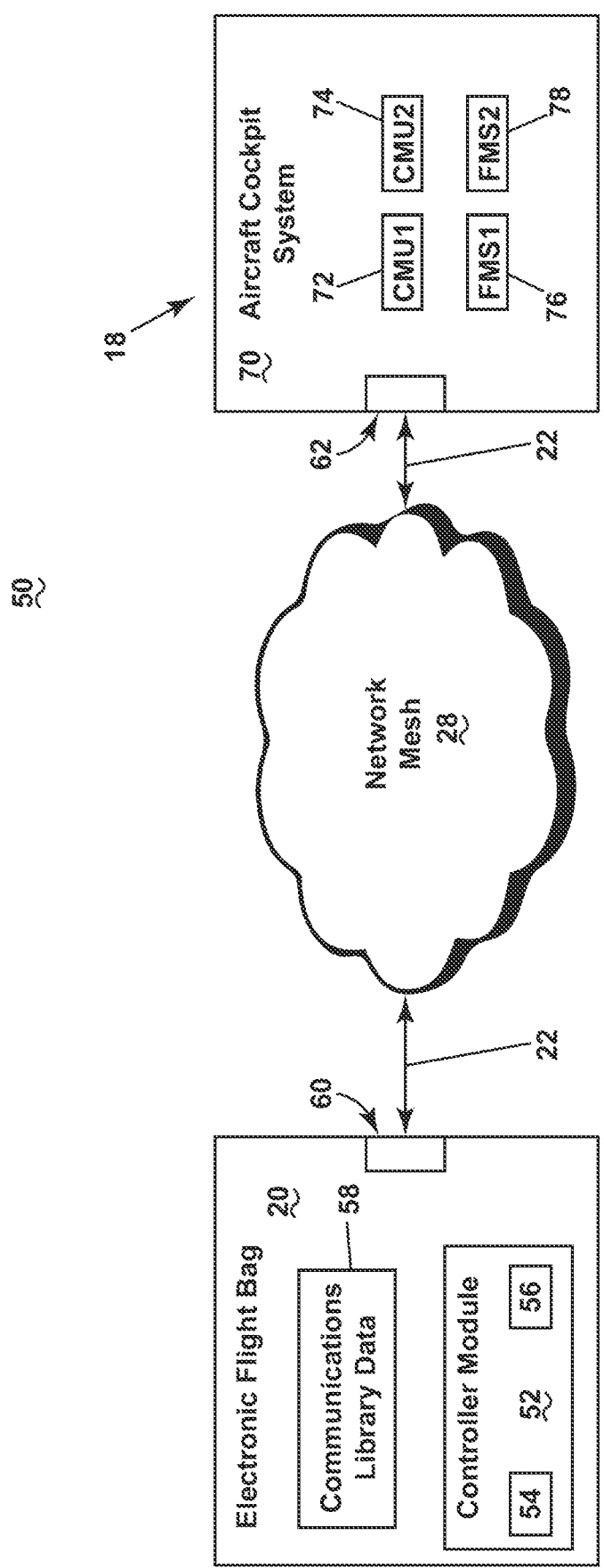
FIG. 3 is a schematic view of an example avionics data networking defining communication between an Electronic Flight Bag (EFB) and an avionics system, in accordance with various aspects described herein.

FIG. 3 illustrates addition details of specialized data network 50, the EFB 20, and the avionic system 18. As used herein, the specialized data network 50 can be similar to the specialized data network 24 of FIG. 2. As shown, the EFB 20 can schematically include a controller module 52 having a processor 54 and memory 56, and a set of communications library data 58 defining standards, rules, mechanisms, or other information or data used or utilized to communicatively interface with the network mesh 28 or avionics system 18, shown as an aircraft cockpit system 70. The EFB 20 can further include an interface for communicating with the network mesh 28, shown as a network interface 60. Non-limiting examples of the network interface 60 can include hardware and software configurations adapted or configured to exchange, transmit, receive, or otherwise communicate with the network mesh 28 or other network nodes via the transmission pathways 22. In one non-limiting example, the network interface 60 can be based upon, or defined by, a standard or set of standards, such as an ARINC 759 (A759) hardware standard, an ARINC 834 (A834) communications protocol standard, or a combination thereof. In one non-limiting example, the communications library data 58 can be stored in a memory, such as memory 56, of the EFB 20, and can include multiple sets of standards, rules, mechanisms, or other information or data used or utilized to communicatively interface with the network mesh 28 or avionics system 18. For instance, a first set of standards, rules, mechanisms, or other information or data used or utilized to communicatively interface with the network mesh 28 or avionics system 18 can be based upon the A429 standard, while a separate and distinct second set of standards, rules, mechanisms, or other information or data can be based upon the A664 standard. In this sense, the communications library data 58 can define how the EFB is configured to or able to communicate or interface in accordance with different communication or different specialized networks, by way of the network interface 60. In non-limiting examples, the network interface 60 of the EFB 20 can operating dynamically in accordance with at least a subset of the communication library data 58, that is, in accordance with different sets of standards.

The aircraft cockpit system 70 is further illustrated to include a separate Aircraft Interface Device (AID) 62 for communicating with the network mesh 28, a redundant set of Communications Management Units (CMUs), shown as a first CMU 72 and a second CMU 74, and a redundant set of Flight Management Systems (FMSs), shown as a first FMS 76 and a second FMS 78. In one non-limiting example, the AID 62 can include a device that allows to bridge communication domains, standards, data transmission, or the like, while implementing a domain guard for security purposes.

During flight preparation and operations, a pilot can bring an EFB 20 on an aircraft 10, and can communicatively connect the EFB 20 with at least one avionics system 18, such as an FMS 76, 78 of an aircraft cockpit system 70, by way of the specialized data network 50 (e.g. including the network mesh 28). However, different aircraft 10 operate different specialized data networks 50 in accordance with current or legacy specialized data network standards of communication. As such, interfacing the EFB 20 in such a way to be interoperable with different communication standards can be difficult in an environment where reprogramming or recertifying aircraft avionics systems 18 is undesirable due to costs of certification and testing.

Aspects of the disclosure can be included wherein the EFB 20, operating in accordance with the disclosure, can be automatically registered and interfaced with the network mesh 28, another avionics system 18, or the specialized data network 50 of the aircraft 10, without specialized configuration or redesign, recoding, reprogramming, or replacement of the specialized data network 50 or avionics system 18.

As shown, upon connection of the EFB 20 with the network mesh 28 (e.g. via wired or wireless communication on the transmission pathways 22, the network interface 60 can begin attempting to automatically determine or identify the specialized data network 50 standards being utilized by the aircraft 10. The EFB 20 or the network interface 60 can include an auto networking component 84 configured to or adapted to begin interfacing with the network mesh 28 or specialized data network 50. In one non-limiting example, the auto networking component 84 can include security mechanisms to authorize communication between the EFB 20 and the specialized data network 50, perform hardware or software "handshakes," or the like, to achieve or adapt initial networking protocols in place. From there, the controller module (not shown) can operate the network interface 60, the auto networking component 84, or the EFB 20 to begin attempting to open known and predetermined communication ports of the avionics system(s) 18 based on known communications data library 58 configurations.

For example, the EFB 20 may attempt to open a first known communications port (e.g. a first transmission control protocol or "TCP" port) known to be applicable in a first communications standard, such as an A664 port. If the attempt to open the A664 communications port, as defined by the communications data library 58 is successful, the EFB 20, the controller module, the communication data library 58, or the like can determine or otherwise make accounting that the EFB 20 is attempting to connect and communicate with an A664-based specialized data network 50. If the attempt to open the A664 communications port is unsuccessful, the EFB 20 may attempt to open a different or a second known communications port (e.g. a second TCP port) known to be applicable in a second communications standard, such as an A429 port, to determine if the EFB 20 is attempting to connect and communicate with an A429-based specialized data network 50. The EFB 20 can continue attempting to open predetermined communications ports, including but not limited to TCP or User Datagram Protocol (UDP) ports in an attempt to identify, and then connect and communicate with, the specialized data network 50. Thus, aspects of the disclosure can be included wherein a single EFB 20 or CFMS can be communicatively connected with specialized data network 50, without special configuration or awareness of which or what specialized data network 50 the aircraft is utilizing, so long as the specialized data network 50 standards are included in the communications data library 58.

Figure 4:
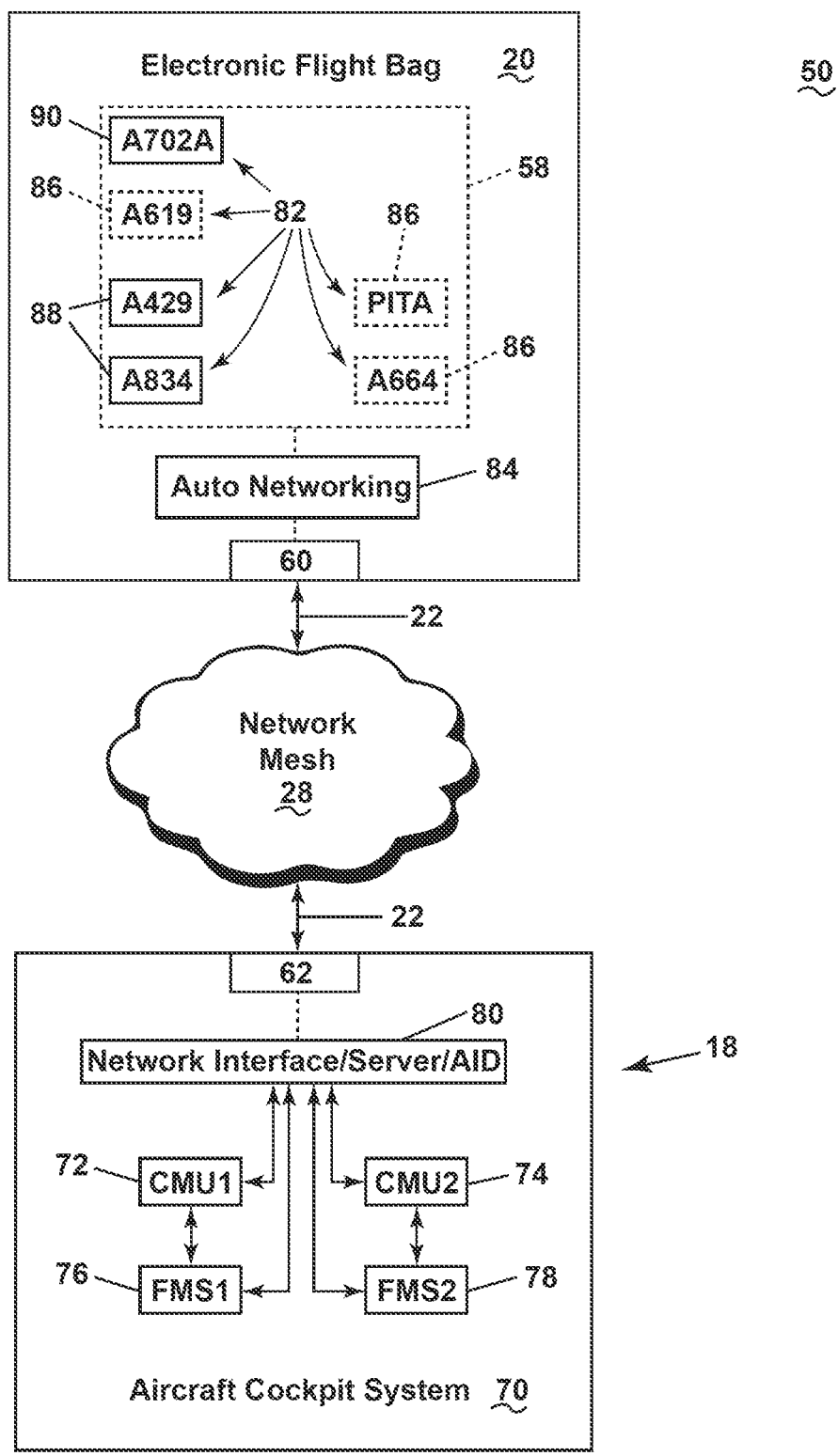
FIG. 4 is schematic system view of the communication between the EFB and the avionics system of FIG. 3, in accordance with various aspects described herein.

FIG. 4 illustrate one non-limiting example of aspects of the disclosure. In the example of FIG. 4, an avionics system 18 in the form of an aircraft cockpit system 70 is preconfigured to communicate with the specialized data network 50 by way of an aircraft network interface 62 operating under A429 and A834 network standards described herein (e.g. not limited to AID, network servers, routers, switches, or any function operating on like devices). Upon connection of the EFB 20 with the specialized data network 50, the network interface 60 and auto networking first connects with the specialized data network 50, and then attempts to open communication ports of the specialized data network 50 to determine which AID 62 or standards are utilized. The EFB 20 illustrates a number of different data network interface standards 82 available and defined within the communications data library 50. As used herein, the set of data network interface standards 82 can include the application level protocols, as explained herein.

In one example, the EFB 20 can first attempt to open one or more A664 communication ports of the specialized data network 50. Since the specialized data network 50 is not operating in accordance with the A664 specification, the opening or those ports or validation of communication on those ports will fail. The EFB 20 can, for example, note the A664 specification of the set of data network interface standards 82 is not applicable (as shown by dotted outline denoting a "unselected" network standard 86). The process can then be repeated moving through other possible data network interface standards 82 until the correctly selected data network interface standard 82 accomplishes or successfully opens communications ports, as explained herein. The "selected" data interface standards 88 are denoted by a solid outline, and match the avionics system 18 aircraft network interface 80 standards (e.g. not limited to AID, network servers, routers, switches, or any function operating on like devices). As shown, the EFB 20 can include a similar process of opening communication ports and sequentially moving through data network interface standards 82 for both compatible receiving of data transmissions, as well as for compatible sending of data transmissions. For examples, the A702A data network interface standard 90 is shown as selected for sending data transmissions, separate and apart from determining the A429 and A834 data network interface standards 88 are selected for receiving data transmissions.

Once the suspected or selected data network interface standards 88 are identified, non-limiting aspects of the disclosure can be included wherein, for example, the EFB 20 receives a set of data transmissions traversing the specialized data network 50, and attempts to interpret, decode, or otherwise facilitate use of the data transmissions in order to validate or ensure the suspected or selected data network interface standards 88 are correct. For example, a failed attempted interpretation of the data transmission received by the EFB 20 can indicate the selected data network interface standard(s) 88 are incorrect, and that the EFB 20 will try to identify and connect with another or a different network interface standard 82. In contrast, a successful interpretation of the data transmission received by the EFB 20 can indicate or validate that the selected data network interface standard(s) 88 is correct. If a determination is made that the suspected or selected data interface standards 88 are correct (or otherwise, not determined they are incorrect), the EFB 20 can be operated in accordance with the selected data network interface standard(s) 88 to communicate with the specialized data network 50 in accordance with the selected data network interface standard(s) 88. In this sense, the EFB 20 can then proceed to communicate with, for example, the first or second FMS 76, 78, or a combination thereof, in order to operate the aircraft 10. In another non-limiting example, The FMS 76, 78 can provide all the data it contains to the last byte about how the flight plan looks like, however, the flight plan is limited to display it to the pilot per a fixed set of requirements of the display units. The fact that the FMS 76, 78 can receive such a data structure enables EFB 20, applications thereon, or the like, to display the data in novel ways that provide more insights to the pilots on the status of the flight, departure or landing procedures. Moreover, it can provide insights and alerts to the pilots for increased safety and better fuel efficiency. Also, the EFB 20 can edit, alter, or otherwise modify the route, flight plan, or other parameters of the FMS 76, 78.

In one non-limiting example, the ordering of which to prioritize the different network interface standard 82 attempts can be based upon a limited user-selectable input, or readable data of the aircraft or specialized data networks thereon. In another non-limiting example, aspects of the disclosure can be applicable to automatically interface with a simulated avionics system environment, as opposed to an actual "real world" aircraft environment. In yet another non-limiting example, the communications library data 58 can library can either be instantiated to identify the environment by itself or it can ask the AID 62 (or any device in the aircraft 10 via the AID 62) to provide the current configuration.

Figure 5:
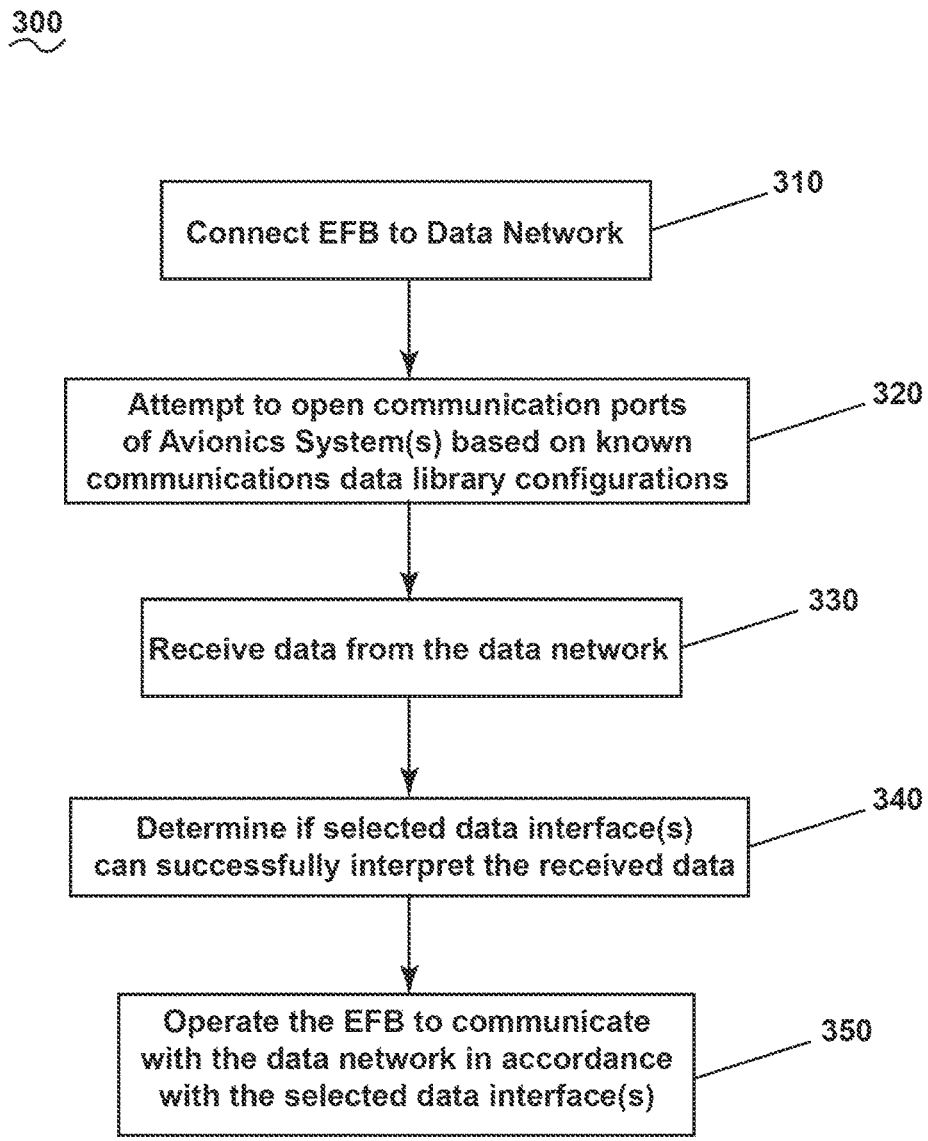
FIG. 5 is a flow chart diagram showing a method of configuring communications between a device and an avionic system in a specialized data network, in accordance with various aspects described herein.

FIG. 5 illustrates a flow chart demonstrating a method 300 of automatically configuring an EFB 20 to communicate with an unknown specialized data network 50. The method 300 begins by connecting the EFB 20 to the specialized data network 50 at 310. Next, the EFB 20 attempts to open communication ports of the avionics system 18 or the specialized data network 50 based on known communications ports of the data network interface standards 82 of the communications data library 58 configurations, at 320. Once the EFB 20 selects or suspects the data network specification is correct, the EFB 20 can receive a set or subset of data traversing the specialized data network, at 330. The EFB 20 can work or attempt to interpret, decode, or otherwise facilitate use of the data transmissions in order to validate or ensure the suspected or selected data network interface standards 88 are correct, at 340. Finally, if the suspected or selected data network interface standard 88 is correct, the EFB 20 can be configured to operate in accordance with the respective selected data network interface standard 88 to communicate with the specialized data network 50, at 350.

The sequence depicted is for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method. For example, known communications ports or port ranges (e.g. multiple ports) can be polled at the same time (e.g. simultaneously) to increase response and setup time. In another example, once an initial set of network data is successfully decoded or validated, that data can contain additional information for configuration of the specialized data network. In yet another example, the EFB 20 can utilize that additional information for configuration to request additional information for configuration, or to validate the rest of the setup process has completed if further data is also successfully received.

Many other possible aspects and configurations in addition to that shown in the above figures are contemplated by the present disclosure.

The aspects disclosed herein provide a system adapted to automatically configure itself for communication by way of scanning the network environment and selecting the network configuration that enables interaction to occur. The technical effect is that the above-described aspects enables a device to communicate with an avionics network without knowledge of what communications standards the network utilizes, and without modifying the aircraft avionics on the network. One advantage that can be realized in the above aspects is that the above described aspects enables avoiding configuration and customization of different interfaces from different aircraft configurations. Pilots are not typically trained in these technical environments, and not capable to reconfigure the environments in situ. By automating the process, development time is reduced in application programming for the EFB, and the user experience remains high by the automated process. Additionally, with aspects of the disclosure, developers can avoid configuring or adapting EFB s on a per-airframe-basis. By implementing multiple communication library data sets, this solution is easier to debug and maintain in a per-airframe-basis, and will be easier for developers to develop limited applications despite a large number of different aircraft in a fleet.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A non-transitory computer readable medium storing a program configured to cause a computer to execute a method of automatic configuration of a communications interface of an aircraft data network, the method of automatic configuration comprising:
   connecting an Electronic Flight Bag (EFB) to the aircraft data network, the aircraft data network being one of a set of data networks defined by a communications data library defining a corresponding set of communications data library configurations;
   attempting to open communication ports of the aircraft data network based on one of the set of communications data library configurations, defining a selected communications interface;
   in response to attempting to open communication ports, receiving data from the aircraft data network;
   determining, by a controller module, if the selected communications interface can interpret the received data; and
   upon successful interpretation of the received data, operate the communications interface of the EFB in accordance with the selected communications interface.

2. The non-transitory computer readable medium of claim 1, wherein the method of automatic configuration further comprises pre-loading the EFB with the set of communication data library configurations for the set of aircraft data networks.

3. The non-transitory computer readable medium of claim 1, wherein the aircraft data network defines a specialized avionics data protocol.

4. The non-transitory computer readable medium of claim 3, wherein the method of automatic configuration further comprises operating the communications interface of the EFB in accordance with at least one ARINC-compliant avionics protocols.

5. The non-transitory computer readable medium of claim 3 wherein the selected communications interface can further include at least one application-level protocol.

6. The non-transitory computer readable medium of claim 5, wherein the method of automatic configuration further comprises operating the communications interface of the EFB in accordance with at least one ARINC compliant application level protocols.

7. The non-transitory computer readable medium of claim 1, wherein the aircraft data network defines a legacy network standard.

8. The non-transitory computer readable medium of claim 1, wherein the method of automatic configuration further comprises determining if the selected communications interface can interpret the received data by validating the received data.

9. The non-transitory computer readable medium of claim 1, wherein the method of automatic configuration further comprises receiving a user-selectable input at the EFB defining a user-selected input, and wherein attempting to open communication ports of the aircraft data network is further based on prioritizing at least one selected communications interface associated with the user-selected input.

10. The non-transitory computer readable medium of claim 9, wherein the user-selectable input includes multiple aircraft models.

11. The non-transitory computer readable medium of claim 1, wherein attempting to open communication ports includes polling at least one of multiple communication ports simultaneously or a set of port ranges all at once.

12. The non-transitory computer readable medium of claim 1, wherein operating the communications interface of the EFB in accordance with the selected communications interface enables the EFB to communicate with at least one avionics system of an aircraft.

13. The non-transitory computer readable medium of claim 12, wherein the at least one avionics system of the aircraft is a Flight Management System (FMS).

14. The non-transitory computer readable medium of claim 1, wherein the method of automatic configuration further comprises, upon unsuccessful interpretation of the received data, attempting to open communication ports of the aircraft data network based another selected communications interface.

15. A non-transitory computer readable medium storing a program configured to cause a computer to execute a method of communicating with an avionics specific data network, the method of communication comprising:
   upon connection of a communications interface with the avionics specific data network, select, by a controller module, a communication interface configuration;
   attempt to open communication ports of the avionics specific data network based on the selected communication interface configuration;
   receive data from the avionics specific data network;
   determine if the selected communication interface configuration can interpret the received data; and
   upon successful interpretation of the received data, operate the communications interface in accordance with the selected communication interface configuration.

16. The non-transitory computer readable medium of claim 15, further comprising a user input, and wherein the controller module is further configured to attempt to open communication ports of the avionics specific data network further based on prioritizing a subset of the communication interface configurations associated with the user-selected input.

17. The non-transitory computer readable medium of claim 16, wherein the user input includes a selectable list of aircraft models.

18. The non-transitory computer readable medium of claim 15, wherein upon successful interpretation of the received data, the controller module is configured to operate the communications interface of the in accordance with the selected communication interface configuration to communicate with at least one avionics system of an aircraft.

19. The non-transitory computer readable medium of claim 15, wherein the controller module is further configured to, upon unsuccessful interpretation of the received data, select another communication interface configuration and attempt to open communication ports of the avionics specific data network based on the selected another communication interface configuration.

20. A communications device for communicating with an unknown avionics specific data network, comprising:
  a memory; and
  a controller module, wherein the controller module is configured to execute a set of instructions stored in the memory, the set of instructions including:
    upon connection of a communications interface with the unknown avionics specific data network, select a known communication interface configuration;
    attempt to open communication ports of the unknown avionics specific data network based on the selected known communication interface configuration;
    receive data from the unknown avionics specific data network;
    determine if the selected known communication interface configuration can interpret the received data; and
    upon successful interpretation of the received data, operate the communications interface in accordance with the selected known communication interface configuration.

* * * * *